April 13, 1926.

H. W. ALDEN

STEERING WHEEL BRAKE

Filed Dec. 26, 1922

INVENTOR
Herbert W. Alden,
by
his ATTORNEYS

April 13, 1926. 1,580,631
H. W. ALDEN
STEERING WHEEL BRAKE
Filed Dec. 26, 1922 2 Sheets-Sheet 2
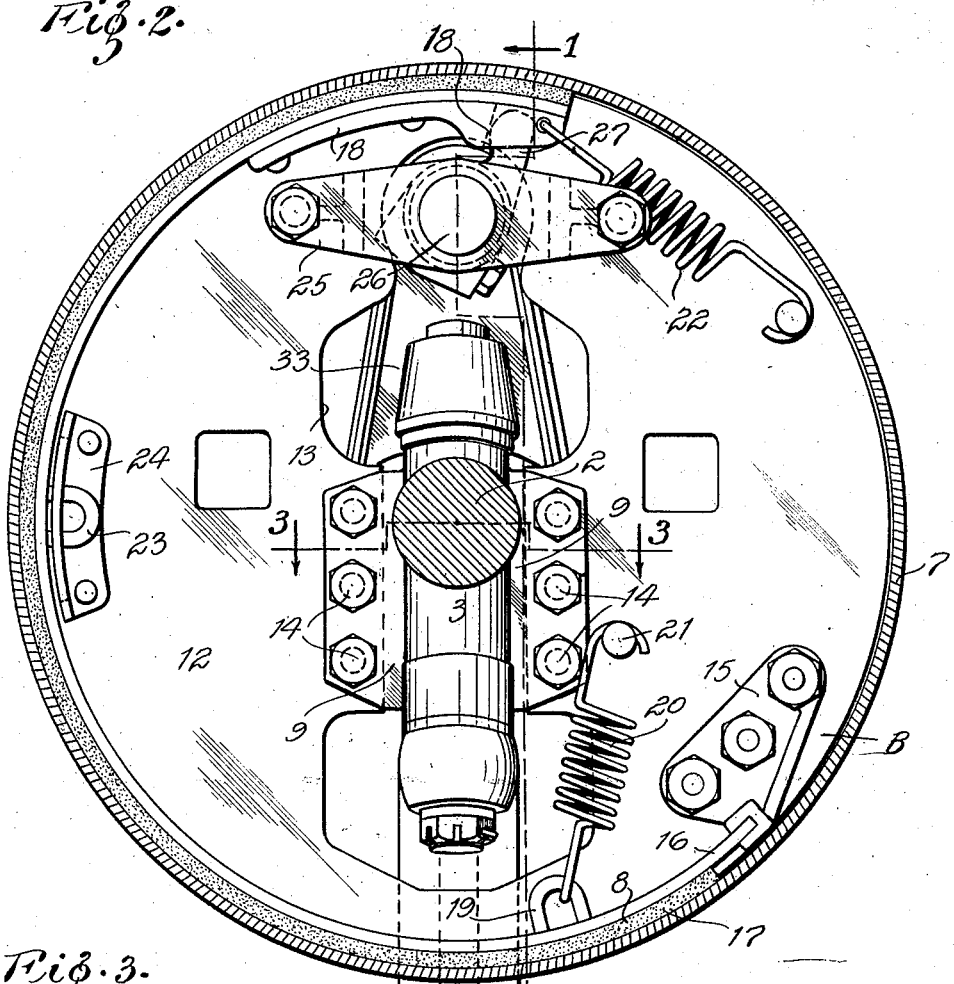
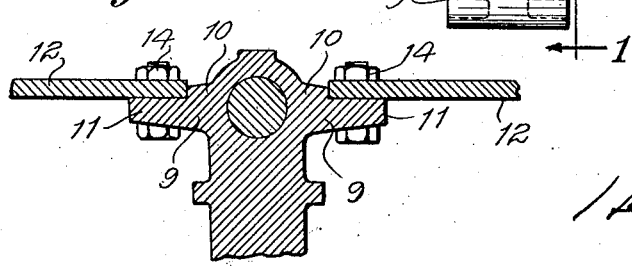

Patented Apr. 13, 1926.

1,580,631

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF MICHIGAN.

STEERING-WHEEL BRAKE.

Application filed December 26, 1922. Serial No. 608,943.

*To all whom it may concern:*

Be it known that I, HERBERT W. ALDEN, a citizen of the United States, and a resident of the city of Detroit, in the county of Wayne and State of Michigan, have invented a new and useful Improvement in Steering-Wheel Brakes, of which the following is a specification.

The present invention relates to brakes for the steering wheels of automobiles and the like. The principal objects of the invention are to devise a brake that will operate equally well in all angular positions of the wheel whether the steering knuckle swivels on a vertical axis or on an axis that would strike the ground in or close to the plane of the tread of the wheel. Other principal objects are to simplify the brake mechanism and the mounting thereof, to provide for replacement of the brake band as when required to vary its frictional area or for repairs, to overcome the need for delicate adjustments that are required by ordinary brakes, and generally to improve the construction of brakes. The invention consists in the parts and combinations and arrangements of parts hereinafter described and claimed.

In the accompanying drawing wherein like numerals refer to like parts wherever they occur, Fig. 1 is a vertical cross-section illustrating my brake applied to a front wheel that is mounted on a knuckle which swivels on an inclined axis, said section being taken on the line 1—1 of Fig. 2;

Fig. 2 is a vertical section on the line 2—2 of Fig. 1; and

Fig. 3 is a detail section of the steering knuckle on the line 3—3 of Fig. 2.

Figure 1:
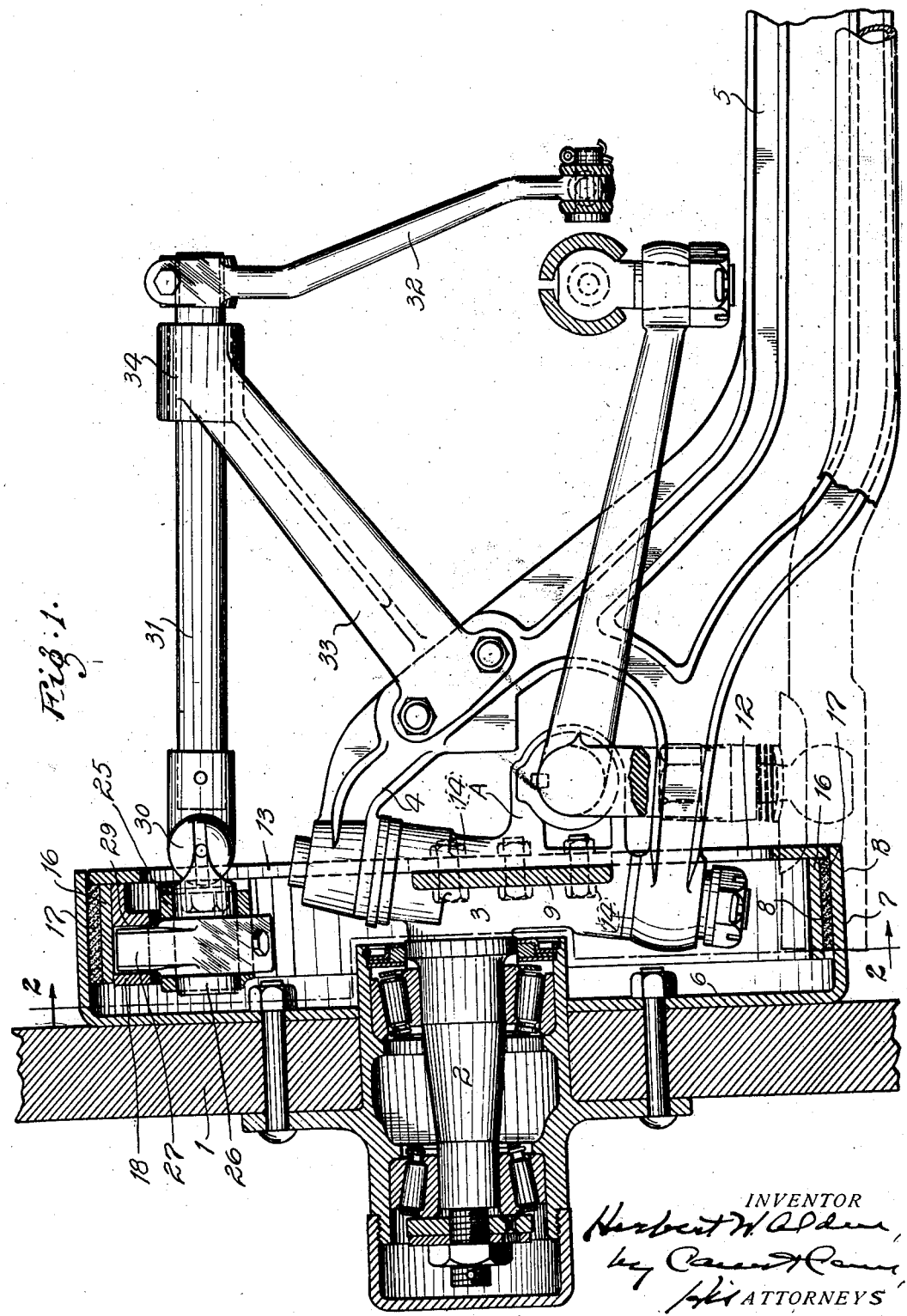

The wheel 1 is mounted on a spindle 2 which is integral with the knuckle pin 3 of a steering knuckle A which is swiveled or journaled in the forked end or steering head 4 of an axle 5, the axis of said knuckle being preferably so inclined from the vertical as to strike the ground at or close to the plane of the tread of the wheel. The steering knuckle is provided with any suitable means for manipulating the same.

The wheel is provided with a suitable brake drum B concentric with the axis thereof. This drum preferably comprises a disk portion 6 bolted to the wheel and having an annular flange or rim 7 for cooperation with the brake band or shoe 8, which is mounted to turn with the steering knuckle.

The steering knuckle is provided with thick lugs 9 preferably elongated vertically, which are disposed on opposite sides of the knuckle pin and substantially parallel with the wheel. These lugs are integral with the knuckle pin and comprise an inner portion 10 of full thickness and a projecting marginal portion 11 of less thickness offset inwardly (i. e. away from the wheel) and whose outer face (i. e. the face toward the wheel) is substantially parallel to the wheel. This arrangement forms a shoulder at the offset and the shoulders on the two lugs are preferably parallel and vertical.

A flat disk or plate 12 whose diameter is substantially equal to the inner diameter of the brake drum is mounted on the steering knuckle parallel with the wheel and with its outer edge just inside the brake drum. This disk has a central perforation 13 whose side walls fit against the side edges of the thick portions of said elongated lugs 9 thereby bringing the adjacent portions of said plate or disk to bear flatwise against the projecting marginal portions of said lugs, against which said plate or disk is secured, as by suitable bolts 14 passing through it and said lugs. In this manner, the disk is not only accurately positioned and firmly fixed, but by reason of its inner edge bearing against the sides of the lugs, the securing bolts or rivets are to a very large extent relieved of the stresses due to braking action.

On the inner face of said disk near the periphery thereof is mounted a lug or anchoring fitting 15 by means of any suitable fasteners, such as bolts. This anchor lug comprises a flat portion that bears flatwise against the disk and a portion projecting outwardly therefrom in the form of a rim or flange, which terminates in a fork or yoke close to the periphery of the disk and forming a recess of suitable width to accommodate the end of the metal body portion 16 of a brake band 8, which is provided with any suitable brake lining or facing 17. Ordinarily, the length of the brake band will be about two thirds of the circumference of the drum, although this length will vary considerably according as the required frictional area may vary.

The free end of the brake band is provided with a lug or fitting 18 designed for cooperation with a suitable actuating member. The brake band is provided with a hook or yoke 19 near the anchored end thereof to which is attached one end of a spring 20 the other end of which is attached to a stud 21 or other member mounted on the disk in such position that the spring tends to pull the brake band clear of the drum and against the anchor lug 15. A similar spring 22 attached to the free end of the brake band and to the disk tends to pull the free end of the brake band clear of the drum. The intermediate portion of the brake band is provided with a guide member 23 arranged to cooperate with a guide member 24 provided therefor on said disk.

Near the free end of the brake band, the disk is provided with a bracket 25 which bridges the opening in the disk and has its ends riveted or otherwise securely fastened to said disk. The middle portion of this bracket is bored out to form a journal or support for a shaft section 26 upon which is formed or mounted a cam portion or cam 27 arranged for cooperation with the end fitting 18 of said brake band. Preferably this cam has a single tooth or wiping portion that extends outwardly opposite the end wall of the brake band fitting 28 in position to cooperate therewith. Preferably the end of this fitting is forked to form a recess for the cam tooth, which thus serves to keep the brake from shifting out of place as shown at 29.

The shaft section above mentioned projects through the opening in the disk and terminates in a universal joint 30 located in alinement with the axis of the steering knuckle, said universal joint being connected to a second shaft section 31 which in turn is provided with an actuating arm 32 that is operatively connected to a pedal or hand lever under the control of the operator. The last mentioned shaft section is mounted on a bifurcated bracket 33 that straddles and is bolted or otherwise secured to the upper member of the yoke or steering head of the axle, being set therein at an angle that will bring the free end thereof far enough inward from the wheel to properly mount said shaft section. The free end of the bracket is bored to provide a substantially horizontal journal 34 for said shaft section.

From the foregoing description, it is obvious that the parts that are mounted on the disk will swivel with the steering knuckle and maintain their operative relations throughout all angular movement of the wheel, whether the axis of the steering knuckle is vertical or inclined.

The principal advantages of this construction are the following:

By reason of one end of the brake band abutting against a fixed anchor plate, the brake operating cam will continue to act against the free end of said brake band to whatever extent is necessary to set the brake, this action being made feasible by the long range of movement afforded by the one-tooth cam, so that there is no occasion for the delicate adjustment required by ordinary brakes. In fact, after the plates are once mounted, there is never any occasion for adjusting them for wear or the like. In the next place, the simplicity of the construction makes it a very simple matter to replace a brake band with another that will afford the desired braking area or surface. The manner of mounting the disk upon the steering knuckle is well adapted for economical manufacture and assembly of parts and utilizes the metal of the disk to relieve the mounting bolts of the stresses due to braking action. The wide spread of the bracket that supports the inner shaft section distributes the stresses in the disk and furnishes a wide and well positioned journal for said shaft section; and the great reach of the bracket that supports the other shaft section places the journal therefor in a desirable position.

Obviously the construction hereinbefore described admits of variation without departing from my invention, and I do not wish to be restricted to the details hereinbefore described.

What I claim is:—

1. A brake comprising a drum, a mounting member, a brake band mounted on said member in operative relation to said drum and bodily movable circumferentially, and means for operating said band, said mounting member having a fixed portion constituting an abutment for one end of said band and providing a recess in which said end may slide.

2. A brake comprising a drum, a mounting member, a brake band mounted on said member in operative relation to said drum and bodily movable circumferentially, and means for operating said band, said mounting member having a recessed lug fixed thereon in position to slidably receive one end of said band.

3. The combination, with an axle having a steering knuckle swiveled thereon and a wheel on the spindle of said knuckle, of a brake for said wheel, said brake comprising a drum fixed to said wheel, a brake band mounted to swing with said knuckle and means for operating said brake band, said brake band being bodily movable circumferentially and having one end resting slidably in a recess whose bottom constitutes an abutment for said end, and the other end of said brake band being adapted for cooperation with a cam on said operating means.

4. The combination, with an axle having a steering knuckle swiveled thereon and a wheel on the spindle of said knuckle, of a brake for said wheel, said knuckle having a plate disposed parallel with said wheel and having thereon an offset lug adapted to form a recess for the end of a brake band and an abutment therefor, and said brake comprising a drum mounted on the wheel, a brake band movable bodily circumferentially and having an end slidable in said recess and having its other end adapted and arranged for cooperation with a cam, and a brake operating shaft having a section mounted on said plate and provided with said cam.

5. The combination, with an axle having a steering knuckle swiveled thereon and a wheel on the spindle of said knuckle, of a brake for said wheel, said knuckle being swiveled on an axis so inclined from the vertical that it strikes the ground substantially in the plane of the tread of the wheel, said knuckle having on its opposite sides vertically elongated lugs integral therewith, a disk mounted on said lugs parallel with the wheel and having a perforation whose wall fits the outer margin of said lugs a circumferentially movable brake band movably mounted on said disk, an abutment on said disk for the end of said brake band a shaft section mounted on said disk and having a cam in position to bear against the other end of said band, and a second shaft section operatively connected to said first section.

6. The combination, with an axle having a steering knuckle swiveled thereon and a wheel on the spindle of said knuckle, of a brake for said wheel, said knuckle having thereon lugs of non-circular outline integral therewith, a disk having a perforation whose walls fit over said lugs, a brake band mounted on said disk and movable bodily endwise, an abutment on said disk for the end of said brake band and having a recess in which said end is slidable, and means for operating said brake band.

7. The combination, with an axle having a steering knuckle swiveled thereon and a wheel on the spindle of said knuckle, of a brake for said wheel, said knuckle having thereon lugs integral therewith and having outer portions that are offset and parallel with the wheel, and are of non-circular outline a disk having a perforation fitting over the thick portion of said lugs and secured flatwise against said parallel portions, a circumferentially movable brake band mounted on said disk, an abutment on said disk for one end of said brake band, a shaft section mounted on said disk and having a cam in position to bear against the other end of said band, and a second shaft section operatively connected to said first section.

8. The combination, with an axle having a steering knuckle swiveled thereon and a wheel on the spindle of said knuckle, of a brake for said wheel, said knuckle having a perforated disk disposed parallel with said wheel and said brake comprising a drum mounted on the wheel, a brake band supported on said disk and having an end adapted and arranged for cooperation with a cam, and a brake operating shaft having a section extending through said disk and provided with said cam and a section connected to said first mentioned section by a universal joint, said disk having secured thereto a bracket that bridges said perforation in said disk and forms the journal for said first mentioned shaft section, and also having a recessed anchor lug for the other end of said brake band.

9. The combination, with an axle having a steering knuckle swiveled thereon and a wheel on the spindle of said knuckle, of a brake for said wheel, said knuckle having a perforated disk disposed parallel with said wheel and said brake comprising a drum mounted on the wheel, a brake band supported on said disk and having an end adapted and arranged for cooperation with a cam, and a brake operating shaft having a section extending through said disk and provided with said cam and a section connected to said first mentioned section by a universal joint, said disk having secured thereto a bracket that bridges said perforation in said disk and forms the journal for said first mentioned shaft section and a bracket mounted on said axle and extending upwardly and inwardly from the end portion thereof and forming the journal for said second mentioned shaft section.

Signed at Detroit, Michigan, this 18th day of December, 1922.

HERBERT W. ALDEN.